(12) United States Patent
Martin

(10) Patent No.: US 6,248,242 B1
(45) Date of Patent: Jun. 19, 2001

(54) SPRING WATER DELIVERY SYSTEM

(76) Inventor: Andrew G. Martin, 603 Commerce St., Havre de Grace, MD (US) 21078

( * ) Notice: Subject to any disclaimer, the term of this patent is extended or adjusted under 35 U.S.C. 154(b) by 0 days.

(21) Appl. No.: 09/382,323

(22) Filed: Aug. 24, 1999

(51) Int. Cl.[7] .................................................. C02F 1/78

(52) U.S. Cl. .................................. 210/739; 141/1; 141/2; 141/18; 141/98; 141/231; 141/326; 141/349; 210/744; 210/760; 210/765; 210/86; 210/96.1; 210/104; 210/120; 210/192; 210/188; 210/195.1; 210/241

(58) Field of Search .............................. 141/1, 2, 18, 98, 141/231, 326, 349; 210/739, 744, 760, 765, 85, 86, 104, 117, 120, 143, 192, 195.1, 205, 241, 96.1, 188

(56) References Cited

U.S. PATENT DOCUMENTS

| | | |
|---|---|---|
| 4,352,740 | 10/1982 | Grader . |
| 4,821,445 * | 4/1989 | Bass .......................................... 43/55 |
| 5,042,689 | 8/1991 | Mrugala . |
| 5,240,043 | 8/1993 | Campbell . |
| 5,349,992 * | 9/1994 | Gallo et al. ............................ 141/18 |
| 5,803,139 | 9/1998 | Kennedy . |
| 5,950,662 * | 9/1999 | Scott ................................... 137/357 |
| 6,089,420 * | 7/2000 | Rodriguez ............................ 222/608 |

* cited by examiner

*Primary Examiner*—Peter A. Hruskoci
(74) *Attorney, Agent, or Firm*—Larry J. Guffey

(57) ABSTRACT

This invention relates to a Spring Water Delivery System and in particular to a system for bulk delivery of potable spring water to a customer's home. This system includes a bulk water supply truck equipped with a pumping system and an onboard ozone generator for delivery of potable tank water to a customer's supply tank. The supply tank is not pressurized, but uses an electric pump to deliver potable water to the individual faucets in the customer's home

20 Claims, 4 Drawing Sheets

SPRING WATER DELIVERY SYSTEM

BACKGROUND OF THE INVENTION

1. Field of the Invention

The present invention relates generally to a method of purifying and bulk delivery of good tasting spring water to customer's homes. More particularly, this invention pertains to a process and the apparatus for tank wagon bulk delivery and distribution of purified spring water to a bulk storage tank installed in a customer's home. The purified spring water in the present invention is then distributed from the said bulk storage water tank through the plumbing system by an electric pump to the individual faucets in a customer's home. The method and apparatus of this invention reduces both the cost of bulk delivery of purified water and also avoids an expensive requirement to maintain a pressurized bulk storage water tank at the customer's home in comparison to currently available water delivery systems or the delivery of bottled purified water.

2. Description of the Prior Art

The demand for purified potable water has increased sharply on a world wide basis an particularly in the United States primarily because of industrial waste, fertilizers used in agriculture and contamination of natural water sources. Consumer awareness of this problem and preferences for clean, good tasting, purified potable water has resulted in expanded competition in a relatively new market to supply purified potable water. Purchased bottled purified water delivered to customers' homes, offices and places of business have had rapid sales growth. High quality, good tasting purified water has commanded a premium price in the market place, but competitive pressures and consumers' natural resistance to higher purified water prices has resulted in a somewhat limited price range for the commercial sale of purified water. Bottled water packaging and distribution costs present major obstacles to reducing bottled water costs and lowering the prices for this product.

Vent on demand systems such as the water delivery system disclosed in U.S. Pat. No. 5,042,689 for use with bottled water coolers has long been used. However, this invention does not disclose the ozonation or other chemical process to purify the water and, it is clearly not directed at solving the objective of reducing the cost of bulk purified spring water delivery to a customer's faucet in an individual home. Accordingly, it is patentably distinct from the present invention.

Another traditional problem with bulk water delivery systems is purification of the water. This problem was resolved with the disclosure made in U.S. Pat. No. 4,352,740 which generates ozone in feed gas by the electric discharge method. This process dissolves ozone and oxygen in the water stream thereby generating between 4% and 8% by weight of ozone by silent electric discharge with low power per unit ozone that is dissolved in the water thereby disinfecting the water. However, this patent addresses only a process for ozonation of water and not an overall water delivery system as in the present invention. This invention is patentably distinct from the present disclosure.

A further problem in this field was addressed by the teachings of U.S. Pat. No. 5,240,043 which discloses a system for delivery of bulk quantities of potable water from a tank truck using a pressurized system. The patent discloses a delivery valve means for substantially air-free delivery of high quality water. However, this system does not reveal the use of ozone for purification of the water, and as such this disclosure is patentably distinct from the present invention.

One of the most relevant developments in this field is observed in U.S. Pat. No. 5,803,139. This patent discloses a bulk water delivery system, consisting of a water supply truck equipped with a pumping system and an onboard ozone generator for delivery of potable tank water to a customer's supply tank. Critical distinctions in this disclosure from the present invention include the absence of a DC pump system, which runs off the bulk water tank truck's electrical system as observed in the present invention, and the restrictive requirement in U.S. Pat. No. 5,803,139 requiring use of pressurized water tank in the customer's home.

The present invention avoids the limitations of U.S. Pat. No. 5,803,139 of costly plumbing, pressure tank maintenance expense as well as the water delivery problems resulting from a limited pressure system which is attempting to deliver water to multi-faucets through use of a simple inexpensive electric pump to pump fresh purified spring water to as many as desired individual customer's faucets hooked into this system. These improvements make this method superior; less expensive to maintain; patentably distinct; and improve the flow of clean fresh purified spring water to a customer's faucets.

DETAILED DESCRIPTION

Figure 1:
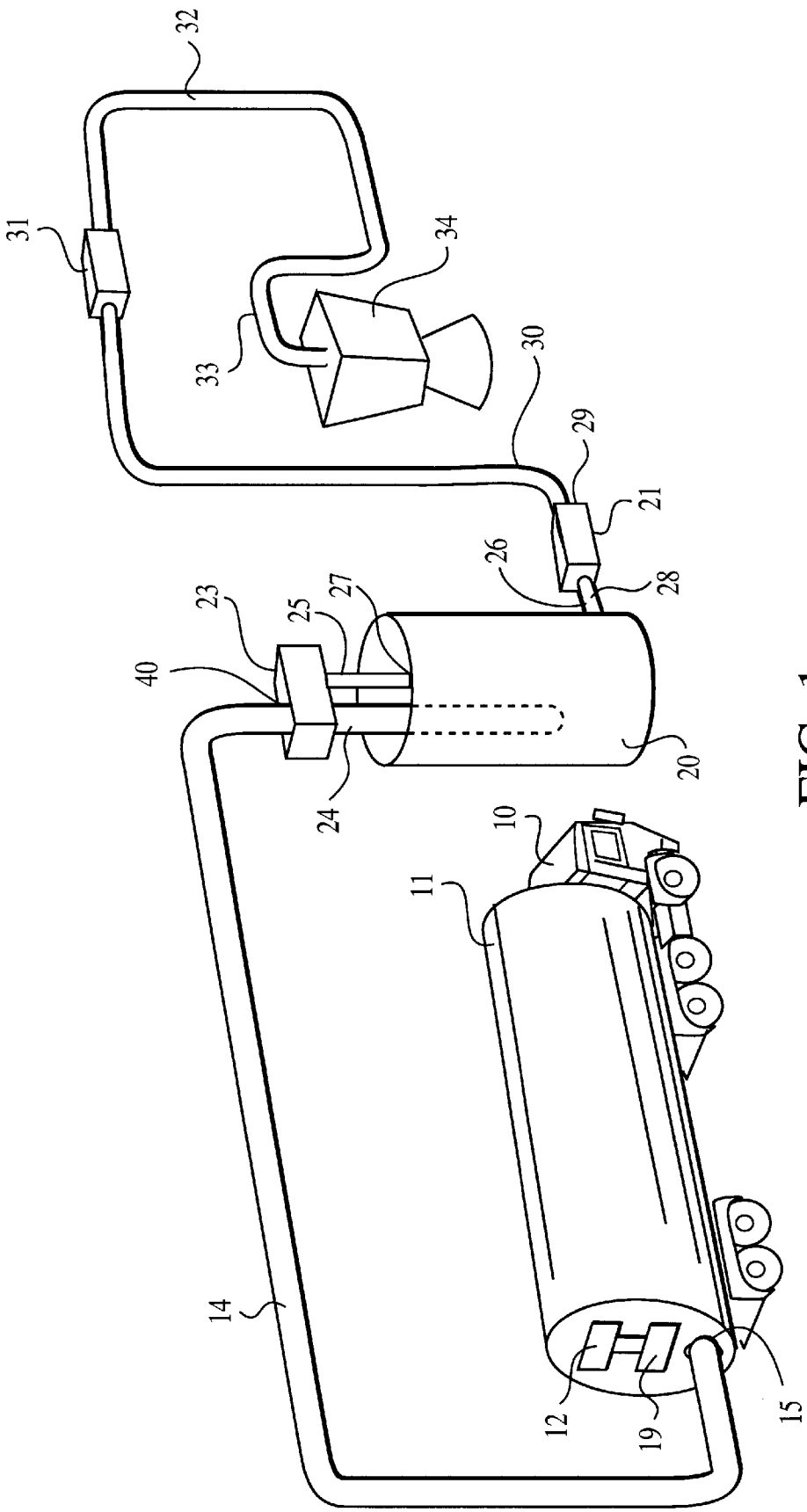
FIG. 1 is a schematic representation of the overall Spring Water Delivery System and the method taught by this invention showing all of the major components of this invention.

Referring to the drawings for a better understanding of the present invention, this invention is susceptible to embodiment in several different forms. The description which follows should be viewed as an illustration of the principles of the invention and is not intended to limit this invention to the embodiments illustrated in the drawings herein.

FIG. 1 is an overall view of the Spring Water Delivery System and the method taught by this invention. FIG. 1 depicts the entire system showing all of the major components. Referring to FIG. 1, bulk delivery tank wagon 10 includes water main tank 11, which is typically 4,000–5,000 gallons in capacity and constructed of stainless steel or other sanitary like material, water pump 12, and which is powered by the DC electrical system of the bulk tank wagon vehicle itself, onboard ozone generator which injects ozone into the water stream, monitors the ozone concentration level, and purifies the water in the distribution system, hose reel 15 and water distribution hose 14. Water distribution hose 14 is connected to lock box 23 at each customer's location, which provides the connecting link to customer storage tank 20 through the inbound water pipe 24 and distribution nozzle 40. Vent pipe 25, which is made of plastic material provides necessary air venting of the Spring Water Delivery System through lock box 23.

Fresh purified water is delivered to the customer's outlets from the storage tank 20 by water pump 21, which is powered by the customer's electrical system, from water storage tank 20 through pipe 28 with shut-off ball valve 26 to the water pump 21 connected to water pipe 30. The potable, water storage tank is made from chemical-resistant plastic. Water pipe 30 leads directly to the customer's water outlets and fixtures such as an Icemaker 31; then into pipe 32 leading to faucet 33 in the customer's sink 34 and additional water fixtures as required by the specific customer application. The application of this invention is equally applicable to commercial, industrial and institutional applications.

It should be observed that water storage tank 20 is not a pressurized water tank as fresh potable water is pumped into the water storage tank from the delivery tank wagon through hose 14 connected to lock box 23 to inbound water fill pipe 24. Outbound fresh potable water is pumped directly to the customer's water outlets and fixtures by water pump 21 through the system described herein.

Figure 2:
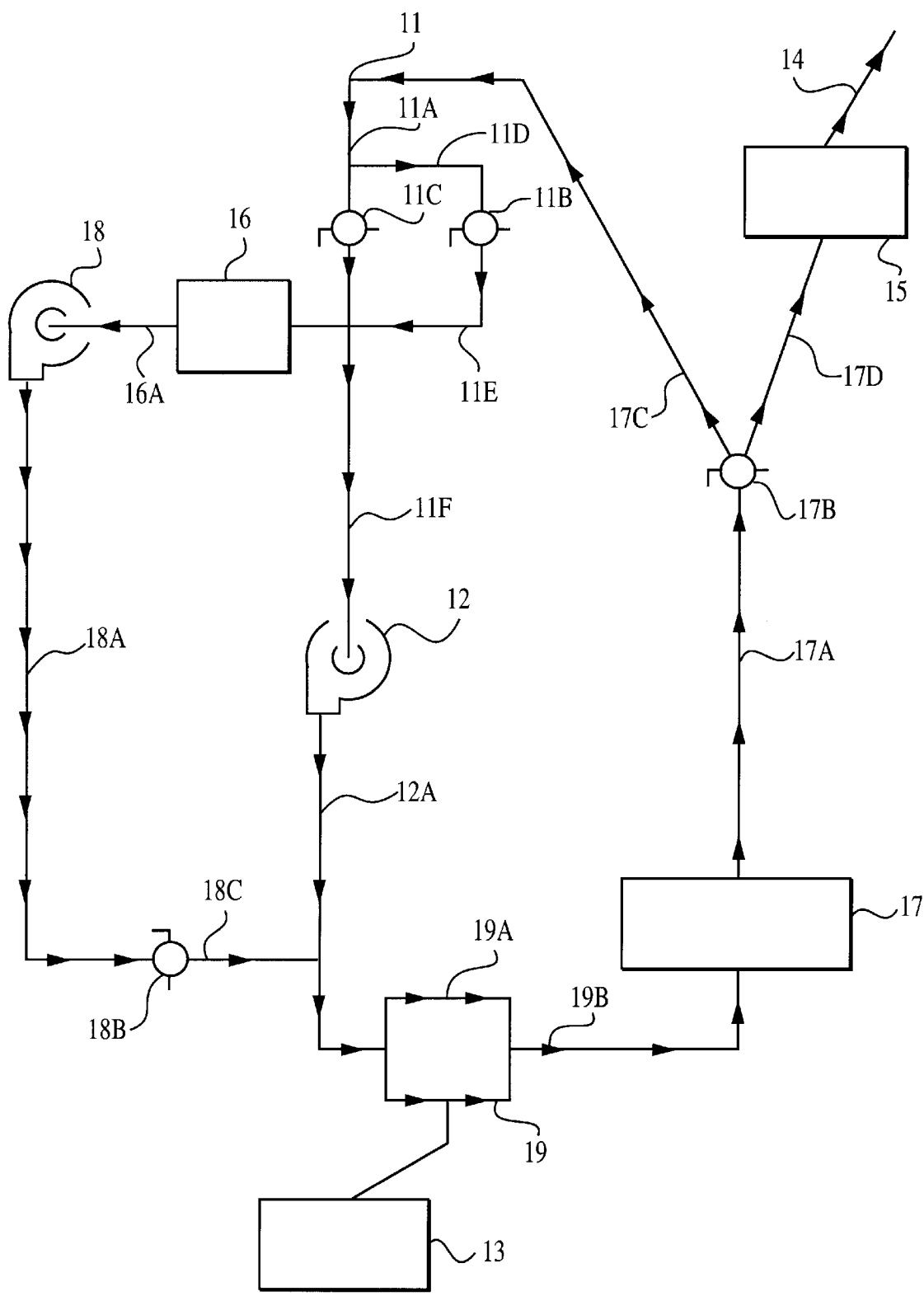
FIG. 2 is a schematic representation of a portion the Spring Water Delivery System showing a schematic of the truck delivery component of this system.

FIG. 2 shows a schematic of the delivery truck water flow whereby spring water contained in the tank 11 enters water line 11a and passes through shut-off ball valve 11C into water line 11F, then through the delivery truck's main pump 12 into water line 12A. Ozone generator 13 provides a steady stream of ozone, which is injected into the water flow by ozone injector 19 into ozone bypass line 19A. The ozone treated water proceeds through water line 19B through meter 17, which accurately measures and monitors the ozone concentration in the water, and then through water line 17A with shut-off ball valve 17B. Shut-off ball valve 17B is utilized to either allow acceptable ozone concentration level water to flow into delivery water line 17D or be diverted back to the main tank 11 through water line 17C as not having sufficient ozone concentration so as to achieve sterility.

The delivery truck portion of this bulk Spring Water delivery System includes a recycling function consisting of interconnected water line 11D with shut-off ball valve 11B and the water line 11E connected to ORP meter 16, then through water line 16A to recycling pump 18. Recycling pump 18 in turn is connected to water line 18A, shut-off ball valve 18B and water line 18C which returns recycled water flowing into water line 19A.

Figure 3:
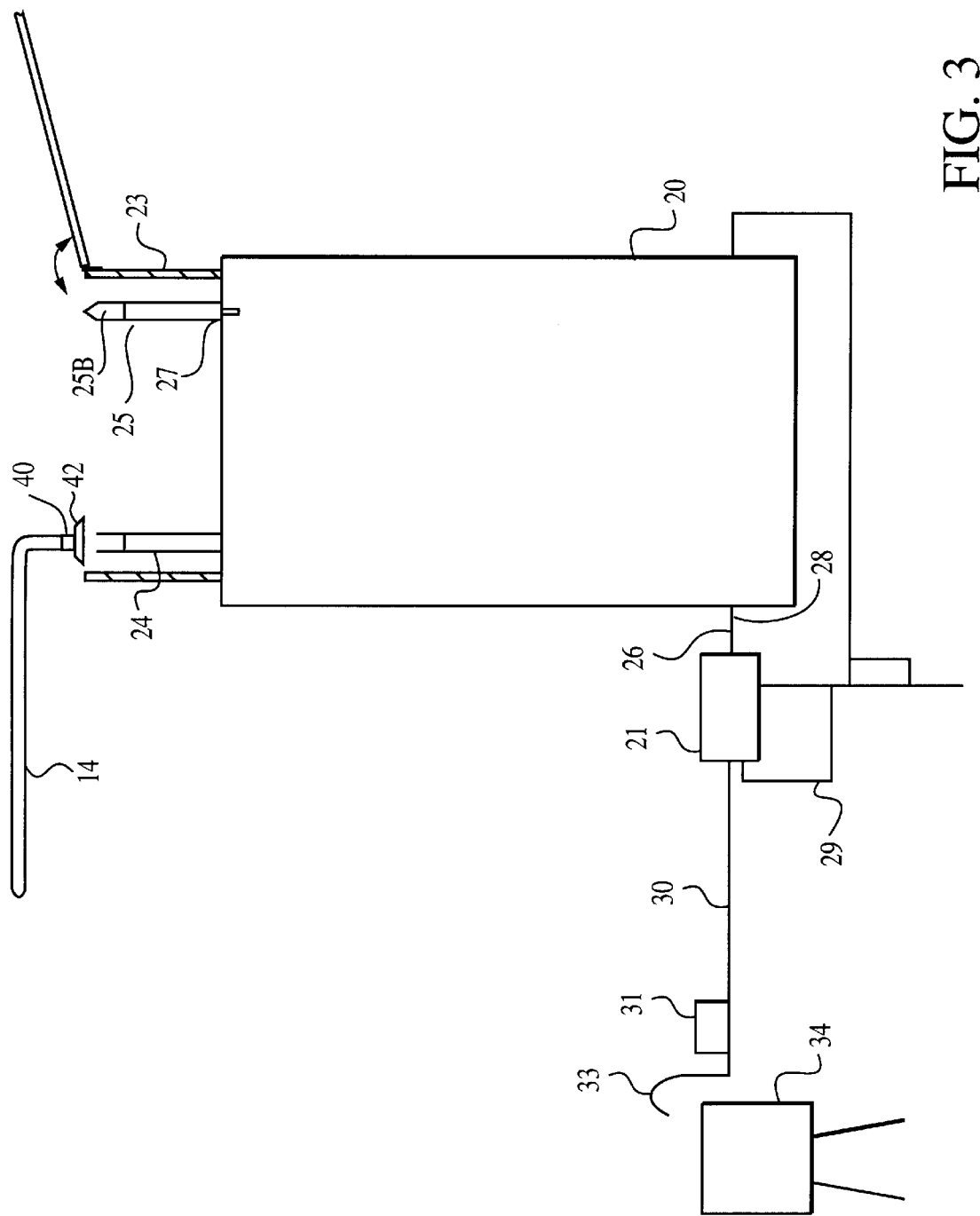
FIG. 3 is a schematic representation of a portion the Spring Water Delivery System showing a schematic of the in-home part of the system which includes a water storage tank, pipe connections to the lock box, pump, and representative in-home water plumbing connections.

FIG. 3 depicts a schematic of the in-home portion of the Spring Water Delivery System. Potable spring water is pumped into water storage tank 20 from the nozzle 40 end of water distribution hose 14 through lock box 23 into water fill pipe 24. Potable water from water storage tank 20 gravity flows through outbound pipe 28 and shut-off ball valve 26 to water pump 21. Water pump 21 is electrically powered by the customer's electrical system. This pump is also equipped with water pressure switch 29 which maintains a constant water pressure range in water line 30 by switching the electric power to water pump 21 on and off to maintain the pressure setting of pressure switch 29.

Fresh purified water is available on demand from water line 30 to the customer's water outlets such as Icemaker 31 and faucet 33. The Spring Water delivery System can contain as many outlets and fixtures as required by the particular customer by adding to the water plumbing system shown in FIG. 3. Also, this invention is applicable to varying commercial, industrial and institutional applications and the like.

Figure 4:
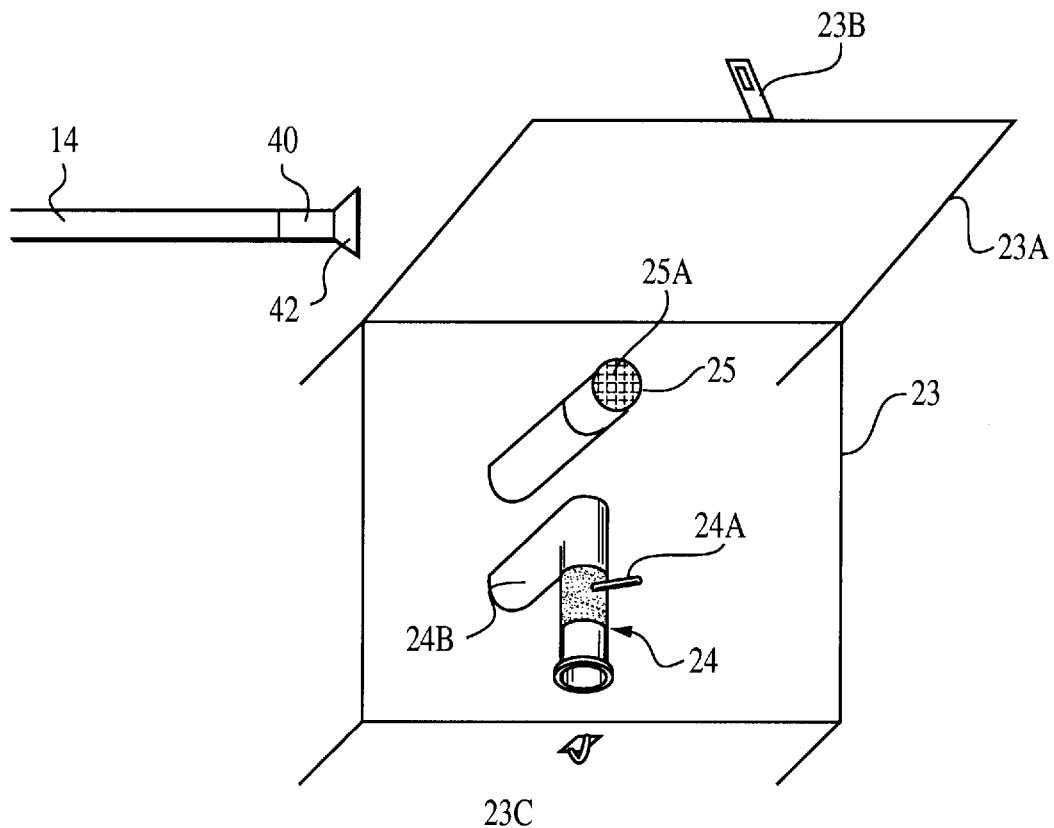
FIG. 4 is a cut away side view of the lock box of the Spring Water Delivery System with the latch and hinged door as used in this invention.

Lock box 23 is shown in detail in FIG. 4. Lock box 23 has a lid latch 23B located on hinged lid 23A which joins and attaches to box latch 23C when lock box 23 is closed. Water fill pipes 24 exits water storage tank 20 through lock box 23. Water storage tank fill shut-off valve 24A is affixed to the exit end of water fill pipe 24 and contains a centered hole through the closure with filter media 24B adhered to the back of water fill valve 24A. The camlock fitting 42 of water distribution hose nozzle 40 forms an air tight fit with water fill pipe 24 to prevent external air from entering the system when water storage tank 20 is being filled. Camlock fitting 42, water distribution hose nozzle 40, and water fill valve 24A can be made of stainless steel to insure long dependable service. Vent pipe 25 exits from storage tank 20 through lock box 23 and is equipped with a replaceable sub-micron vent filter 25A, made of hydrophobic material affixed to the exit end of vent pipe 25. Vent pipe 25 is also equipped with an inline overfill monitoring device such as warning whistle 25B and which also prevents contaminants from entering the system. Warning whistle 25B can be made of a durable plastic material or similar material.

Figure 5:
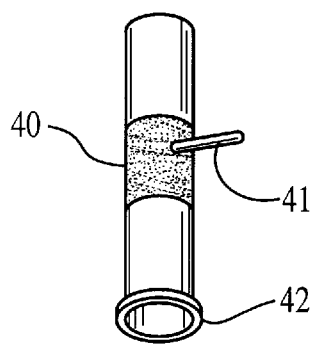
FIG. 5 is a cut away front side view of the camlock fitting at the delivery end of the water distribution hose as used in this invention.

FIG. 5 shows the details of the water distribution hose nozzle 40 which is inserted into water fill valve 24A at the end of water fill pipe 24 through lock box 23. Nozzle 40 is equipped with a removable in-line ball shut-off valve 41 and a camlock fitting 42. The camlock fitting 42 is typically constructed of stainless steel or similar material and provides an air tight fit with water fill valve 24 when fresh potable water is pumped from the bulk delivery truck 10 to the in-home water storage tank 20. A bronze ball shut-off valve has been found to perform well in this invention. While the water storage tank is being filled no outside air is introduced into the system. When potable water is flowing into water storage tank 20, the potable water displaces air in the storage tank and the air exits the system through vent pipe 25. The tank delivery driver can hear the warning device or whistle as the water storage tank is being filled and thereby avoids overfilling the customer's water storage tank. Under normal filling conditions in this system, the purified water in the water storage tank 20 seldom reaches the overflow level of vent filter 25A at the exit end of vent pipe 25 thereby resulting in a very infrequent need to replace the vent filter.

Standard plumbing components without sharp turns or elbows to avoid water flow resistance are used in the system wherever possible. Modified components are used where required for the particular application in the Spring Water Delivery System to provide a closed system for potable water

SUMMARY OF THE INVENTION

In accordance with the invention, a Spring Water Delivery System wherein fresh spring water is delivered to a customer in a bulk water delivery tank truck. The water tank truck is equipped with an onboard water pump, ozone generator, ozone injection and monitoring system, recycling system and delivery water hose equipped with a nozzle having a shut-off valve and camlock fitting. The water distribution nozzle with a camlock fitting is inserted into a water fill valve to form an air tight fit in a lock box device which is connected to a water fill pipe in an in-home non-pressurized water storage tank. Fresh potable water is pumped into the water storage tank, and air trapped in the storage tank exits via a filtered contaminant free vent line through the lock box. Over filling of the water storage tank is avoided by use an inline vent pipe monitor. Potable water is subsequently pumped from the in-home water storage tank by a separate water pump through a line equipped with shut-off valves to the customer's water outlets.

Although only a few exemplary embodiments of the present invention have been described in detail above, those skilled in the art will readily appreciate that many modifications and substitutions are possible in the exemplary embodiments without materially departing from the novel teachings and advantages of the invention. Accordingly, all such modifications and substitutions are intended to be included within the scope of the invention as defined in the following claims.

What is claimed is:

1. A system for delivering fresh, potable water to a customer's site, said system comprising:
    a portable, bulk source of fresh water,
    a potable, water storage tank at said customer's site, said tank having a water fill pipe with a water fill valve connected to said fill pipe, said tank having an air vent pipe with a means, connected to said vent pipe, for monitoring the fill rate of said tank, said tank having an outflow pipe with a water outflow valve connected to said outflow pipe, said outflow pipe having an outlet for delivering said potable water to a specified location on said customer's site,
    a distribution hose detachably coupling said portable, bulk source and said storage tank, said hose having an outlet end having a nozzle configured so as to provide an air-tight coupling with said tank water fill pipe,
    a lock box connected to said water storage tank and covering said tank water fill pipe, said lock box having a lid that is movable between a first position which prevents access to said water fill pipe and a second position which allows said hose nozzle to be detachably coupled to said water fill pipe,
    a means connecting said bulk source of fresh water and said distribution hose for pumping said water from said portable, bulk source to said storage tank,
    a means connected to said outflow pipe for providing a specified, constant water pressure to said water passing through said outflow pipe and to said customer's site,
    a means connected to said distribution hose for injecting ozone into said water so as to purify said water, and
    a means connected to said distribution hose for monitoring and controlling the concentration of ozone in said water passing through said hose.

2. A system for delivering fresh, potable water as recited in claim 1, wherein said portable, bulk source of water is a truck equipped with a bulk water tank.

3. A system for delivering fresh, potable water as recited in claim 2, wherein said air vent pipe is made of plastic, said vent pipe having an exit end, said exit end having removably attached thereto a sub-micron filter.

4. A system for delivering fresh, potable water as recited in claim 3, wherein said hose nozzle having connected thereto a removable, shut-off valve.

5. A system for delivering fresh, potable water as recited in claim 4, wherein said potable, water storage tank is made from chemical-resistant plastic.

6. A system for delivering fresh, potable water as recited in claim 5, wherein said means for monitoring the fill rate of said tank is a whistle connected in said air vent pipe.

7. A system for delivering fresh, potable water as recited in claim 4, wherein said means for monitoring the fill rate of said tank is a whistle connected in said air vent pipe.

8. A system for delivering fresh, potable water as recited in claim 3, wherein said potable, water storage tank is made from chemical-resistant plastic.

9. A system for delivering fresh, potable water as recited in claim 3, wherein said means for monitoring the fill rate of said tank is a whistle connected in said air vent pipe.

10. A system for delivering fresh, potable water as recited in claim 2, wherein said hose nozzle having connected thereto a removable, shut-off valve.

11. A system for delivering fresh, potable water as recited in claim 2, wherein said potable, water storage tank is made from chemical-resistant plastic.

12. A system for delivering fresh, potable water as recited in claim 2, wherein said means for monitoring the fill rate of said tank is a whistle connected in said air vent pipe.

13. A system for delivering fresh, potable water as recited in claim 1, wherein said air vent pipe is made of plastic, said vent pipe having an exit end, said exit end having removably attached thereto a sub-micron filter.

14. A system for delivering fresh, potable water as recited in claim 13, wherein said hose nozzle having connected thereto a removable, shut-off valve.

15. A system for delivering fresh, potable water as recited in claim 1, wherein said hose nozzle having connected thereto a removable, shut-off valve.

16. A system for delivering fresh, potable water as recited in claim 1, wherein said potable, water storage tank is made from chemical-resistant plastic.

17. A system for delivering fresh, potable water as recited in claim 1, wherein said means for monitoring the fill rate of said tank is a whistle connected in said air vent pipe.

18. A method for delivering fresh, potable water to a customer's site, said method comprising the steps of:
    providing a portable, bulk source of fresh water,
    installing a potable, water storage tank at said customer's site, said tank having a water fill pipe with a water fill valve connected to said fill pipe, said tank having an air vent pipe with a means, connected to said vent pipe, for monitoring the fill rate of said tank, said tank having an outflow pipe with a water outflow valve connected to said outflow pipe, said outflow pipe having an outlet for delivering said potable water to a specified location on said customer's site,
    detachably coupling with a distribution hose said portable, bulk source and said storage tank, said hose having an outlet end having a nozzle configured so as to provide an air-tight coupling with said tank water fill pipe,
    covering said tank water fill pipe with a lock box which is connected to said water storage tank, said lock box having a lid that is movable between a first position which prevents access to said water fill pipe and a second position which allows said hose nozzle to be detachably coupled to said water fill pipe,
    pumping, with a means connecting said bulk source of fresh water and said distribution hose, said water from said portable, bulk source to said storage tank,
    providing, with a means connected to said outflow pipe, a specified, constant water pressure to said water passing through said outflow pipe and to said customer's site,
    injecting ozone, with a means connected to said distribution hose, into said water so as to purify said water, and
    monitoring and controlling, with a means connected to said distribution hose, the concentration of ozone in said water passing through said hose.

19. A method for delivering fresh, potable water as recited in claim 18, wherein said portable, bulk source of water is a truck equipped with a bulk water tank.

20. A method for delivering fresh, potable water as recited in claim 18, wherein said hose nozzle having connected thereto a removable, shut-off valve.

* * * * *